United States Patent [19]

Hasegawa

[11] Patent Number: 4,713,840

[45] Date of Patent: Dec. 15, 1987

[54] DATA COMMUNICATION SYSTEM

[75] Inventor: Yonosuke Hasegawa, Tokyo, Japan

[73] Assignee: Pioneer Electronic Corporation, Tokyo, Japan

[21] Appl. No.: 748,638

[22] Filed: Jun. 25, 1985

[30] Foreign Application Priority Data

Jun. 25, 1984 [JP] Japan ................................ 59-131278

[51] Int. Cl.⁴ .............................................. H04H 1/04
[52] U.S. Cl. .......................................... 455/2; 455/3; 455/4; 455/53; 358/86; 340/825.54
[58] Field of Search .......................... 455/2, 4, 3, 6, 53, 455/57, 68; 358/84, 86; 340/825.08, 870.11; 370/90, 96

[56] References Cited

U.S. PATENT DOCUMENTS 4,455,570  6/1984  Saeki et al. ............................... 455/5
4,512,033  4/1985  Schrock .................................... 455/4

Primary Examiner—Robert L. Griffin
Assistant Examiner—Elissa Seidenglanz
Attorney, Agent, or Firm—Sughrue, Mion, Zinn, Macpeak & Seas

[57] ABSTRACT

A data communication system for use in a CATV system or the like employing only simple data communications operations between a central control device and terminal units for effecting a descrambling function. The central control device is connected to the plural terminal units via respective transmission paths. When the central control device is unable to communicate with the terminal units, a transmission carrier is applied to the terminal units via the transmission paths. When a polling operation is to be carried out by the central control device, application of the carrier to the transmission paths is suspended to allow the central control device to communicate with the terminal units. In each of the terminal units, a transmission request thereto is detected from the fact that the carrier has been suspended. Upon the detection of a transmission request, an up-data transmission to the central control device is performed.

3 Claims, 6 Drawing Figures

DATA COMMUNICATION SYSTEM

BACKGROUND OF THE INVENTION

The present invention relates to a data communications system employed in a CATV system or the like.

In the case of a chargeable program in a CATV system, a scrambling signal is superposed on a TV signal transmitted from the center in each channel for which a charge is imposed, and at each subscriber's terminal unit there is provided a descrambler with which, for authorized channels, reproducible picture signals are obtained.

However, this system is disadvantageous in the following points: Since the TV signal is broken before transmission from the center and is reconstituted at the subscriber's terminal unit, the picture (or sound) quality is unavoidably reduced. The terminal units have a high manufacturing cost due to the complexity of the descrambling function. Furthermore, the system requires complex data communications operations to control the descrambling function. Also, it is possible for a dishonest subscriber to provide his own descrambling unit and thus avoid the charges for pay channels.

In order to overcome these difficulties, a method has been proposed in which the system is simplified by providing a main program reception control system at a distribution unit for plural terminal units at a tap-off position of the main line. In this case, each terminal unit is furnished with a converter for converting frequency-multiplexed TV signals of multiple channels into viewable channel signals.

Even in this case, however, it is necessary to collect up-data from the terminal units. Employment of the conventional data communications system between the center and the plurality of terminal units for such a distribution unit is not practical unless the equipment is extensively modified.

SUMMARY OF THE INVENTION

An object of the invention is to solve the above-described problems. More specifically, an object of the invention is to provide a data communications system which is effectively applicable to a small scale CATV system or the like and which utilizes transmission paths provided between a distribution unit installed at a tap-off position of the main line and plural terminal units.

The foregoing and other objects have been achieved by the provision of a data communications system for performing data communication between a central control device and terminal units, in which, according to the invention, the central control device is connected through transmission paths to the terminal units. When the central control device is unable to communicate with the terminal units, a transmission carrier is applied to the transmission paths, and when a polling operation is to be carried out, application of the carrier to the transmission paths connected to the terminal units is suspended so as to allow the central control device to communicate with the terminal units. Each terminal unit thus polled detects a transmission request made thereto from the suspension of application of the carrier, and in response performs an up-data transmission.

DESCRIPTION OF THE PREFERRED EMBODIMENTS

Preferred embodiments of the invention will now be described with reference to the accompanying drawings.

Figure 1:
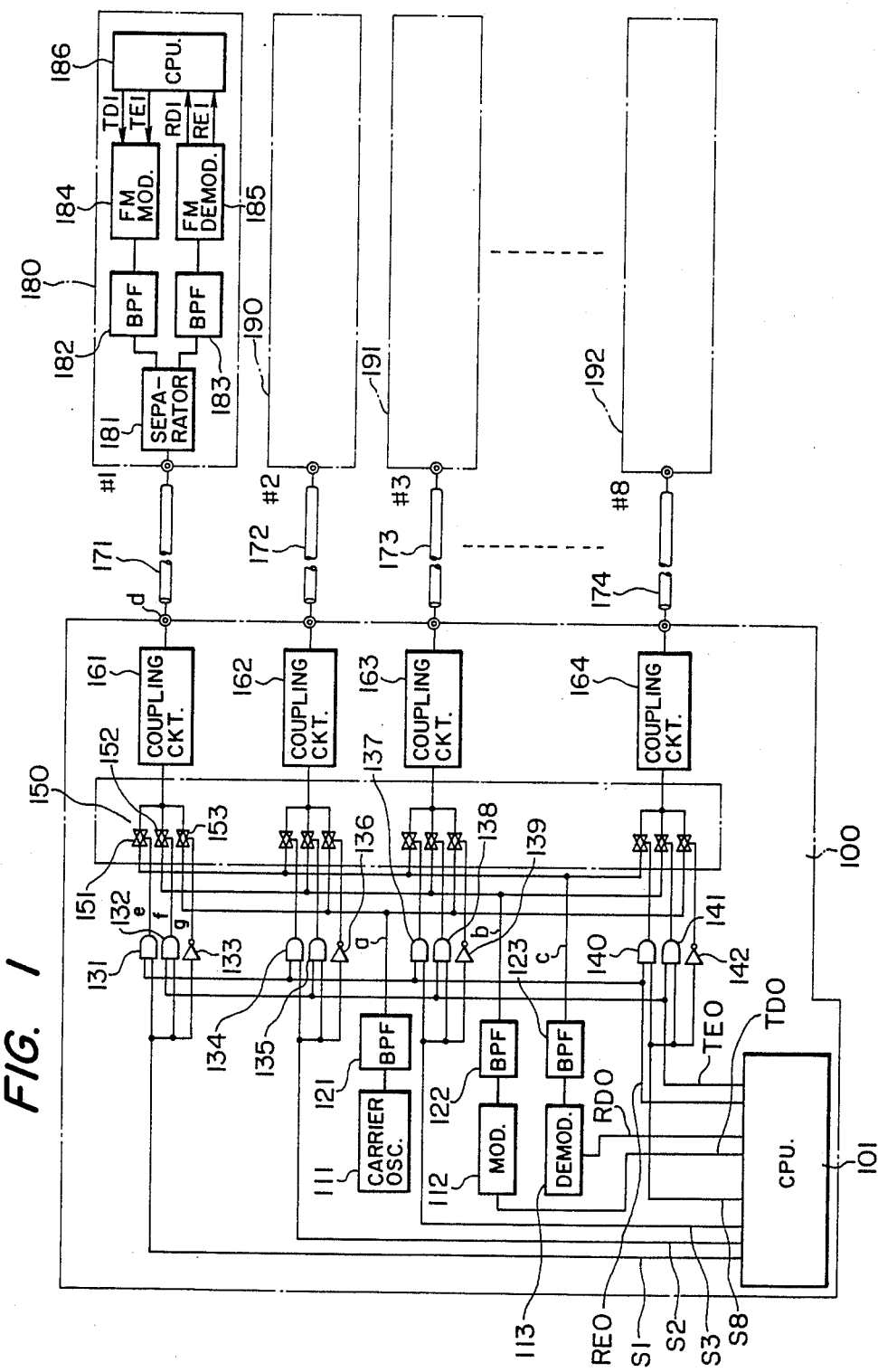
FIG. 1 is a block diagram showing a first embodiment of a data communications system of the invention.

FIG. 1 shows a first embodiment of a data communications system in which two-way data communications are carried out between one central control device 100 and a plurality of terminal units 180, 190, 191, ... and 192 by polling. For clarity, FIG. 1 shows only four terminal units 180, 190, 191 and 192. However, it should be noted that the following description assumes that the central control device 100 services eight terminal units: a first terminal unit 180, a second terminal unit 190, ... , and an eighth terminal unit 192.

The central control device 100 includes a central processing unit 101 for collectively controlling communications; a modulator 112 for frequency-modulating data applied to the terminal units; a demodulator for demodulating the frequencies of data from the terminal units; transmission paths 171, 172, 173, ... and 174 connected to the terminal units; a carrier oscillator 111 for indicating of the occupation of the demodulator 113; bandpass filters 121, 122 and 123 for regulating the frequency bandwidths of the input and output signals of the modulator 112, the demodulator 113, and the oscillator 111; an analog signal changeover switch 150 for selectively applying the input b of the modulator 112 or the output c of the oscillator 111 to the transmission paths 171, 172, 173, ... and 174; and coupling circuits 161, 162, ... and 164 for matching the impedances of the analog signal changeover switch 150 to the impedances of the transmission paths 171, 172, ... and 174.

The above-described analog signal changeover switch may be implemented with relays or the like which employ mechanical contacts; however, in view of communication bandwidth limitations, it is preferable that the changeover switch employ field-effect transistors or diodes.

The analog signal changeover switch 150 is operated (opened and closed) by the central processing unit 101. That is, control signals are applied from the central processing unit 101 through logic gates 131 through 142 (such as AND gates) to the changeover switch 150.

Each of the terminal units 180, 190, 191, ... and 192 has an FM modulator 184 having a bandpass filter 182, an FM demodulator 185 having a bandpass filter 183 and a central processing unit 186 performing data transmission and reception through the FM modulator 184 and the FM demodulator. In FIG. 1, reference numeral 181 designates an input and output signal separator. The separator 181 is a frequency band separator composed of high- and low-pass filters in the case where the modulated waves for transmitting and receiving signals are of different frequency, and in the case where these modulated waves are of the same frequency, the separator may be a directional coupler or branching filter, or more specifically, a switch which operates to switch between transmitting and receiving operations in response to control signals from the central processing unit 186.

Figure 2:
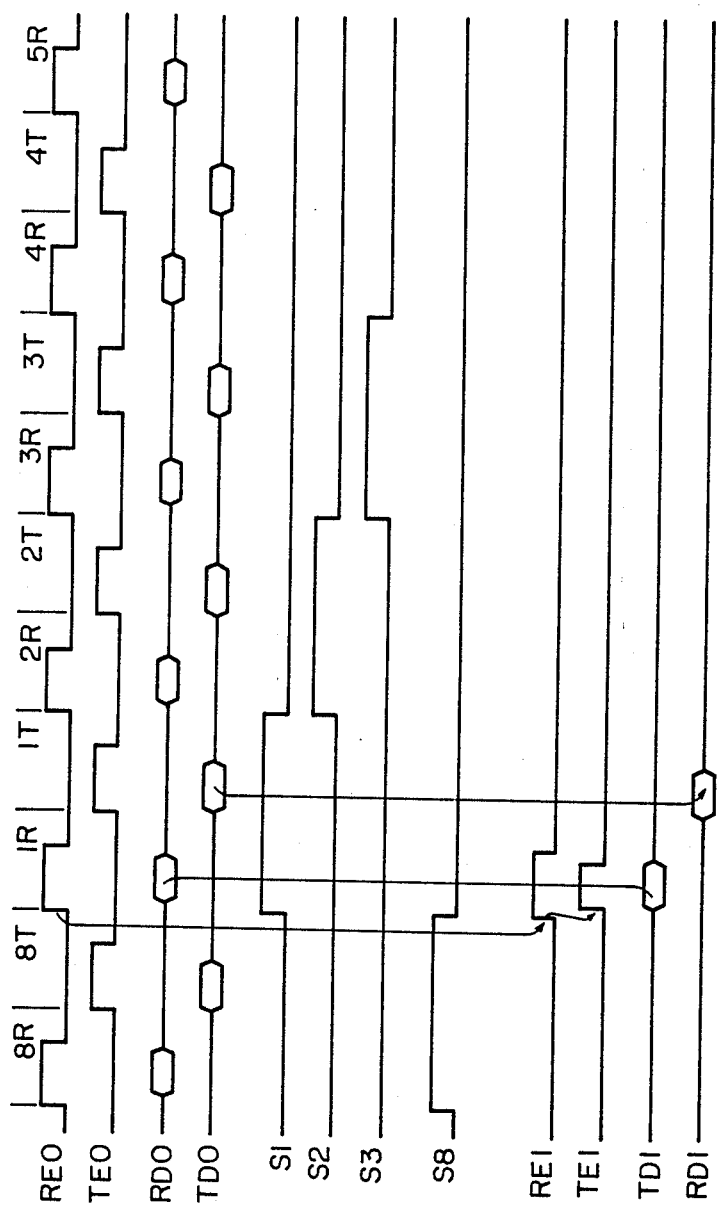
FIG. 2 is a timing chart used for a description of the operation of the first embodiment.

The data communications system according to the invention will be further described with reference to the operation timing chart of FIG. 2 and the signal waveform diagram of FIG. 4. These figures show various signals in the central control device 100 and the terminal units 180 through 192 when in half-duplex communications. In these figures, reference character REO designates a receiving operation re-enabling signal of the central control device; TEO, a transmitting operation enabling signal of the device; RDO, reception data of the central control device; TDO, transmission data of the device; and $S_1$ through $S_8$, selection signals for the terminal units 180, 190, 191 . . . and 192, respectively.

Each of the analog switches 151, 152 and 153 is closed when the switch control signal is at a logic level "1" and open when its switch control signal is at a logic level "0". When the terminal unit selection signal $S_1$ is at "0", the switch 153 is closed and the output of the oscillator 111 is applied to the transmission path 171 and to the demodulator 185 in the terminal unit 180. If, in the case where the demodulator 112 has an output frequency $f_0 \pm f$, the output frequency of the above-described oscillator is set in this range, no problem occurs due to the presence of the input and output signal separator 181 and the bandpass filter 183. The FM demodulator 185 in the terminal unit 180 detects the presence or absence of an input to the demodulator or an input level by amplitude detecting the output of the amplitude limiting amplifier, one element of the FM demodulator. The demodulator outputs a signal represented by RE1. The condition where no input signal (carrier) is present is represented by a logical level "1". In other words, when the terminal unit 180 is not selected by the central control device 100, the signal RE1 is at "0" because of the output of the oscillator 111.

When the signal S1 is raised to "1" in order to start communications, the logical product e of the signals S1 and REO is "1", and thus the analog switch 151 is closed. The transmission path 171 is then connected through the matching coupling circuit 161 to the FM demodulator 113. In the terminal unit 180, as the signal (carrier) of the oscillator 111 is interrupted, the FM demodulator is muted so that the output RE1 is raised to "1". As a result, the central processing unit 186 detects a transmission request.

When there is up-data to be transmitted by the terminal unit 180, the central processing unit 186 raises the signal TE1 to "1", turning on the carrier of the FM modulator 184, and effecting the transmission of the data TD1. In this operation, the central control device 100, being in the signal receiving mode, can receive the data from the terminal unit 180.

The data length should be determined as part of the communications protocol. After reception of the data, the central processing unit 101 sets the signal REO to "0" and ends the signal receiving operation. Next, the central processing unit 101 raises the signal TEO to "1". Therefore, the logical product f of the signal TEO and the signal S1 is "1", and the switch 152 is closed. As a result, the FM modulator 112 is electrically connected through the bandpass filter 122, the analog switch 152, and the matching coupling circuit 161 to the transmission path 171, whereupon the transmission data TDO is frequency modulated and transmitted.

After this signal transmission operation, the terminal unit is placed in the signal receiving state so as to receive transmission data from the central control device 100.

As is apparent from the above description, in the system of the invention, the central control device 100 transmits the carrier when it cannot communicate with a terminal unit to indicate that it is busy, and the device 100 interrupts the carrier to provide a signal transmission request for the terminal unit. After reception of signals from the terminal unit, the device 100 transmits the carrier again. The terminal unit detects the signal transmission request from the fact that the carrier applied to the transmission path is interrupted. After signal transmission, the terminal unit is made ready for receiving signals and then performs the signal receiving operation. Accordingly, the central control device performs communications with high efficiency using a single input and output path between it and plural terminal units.

Figure 4:
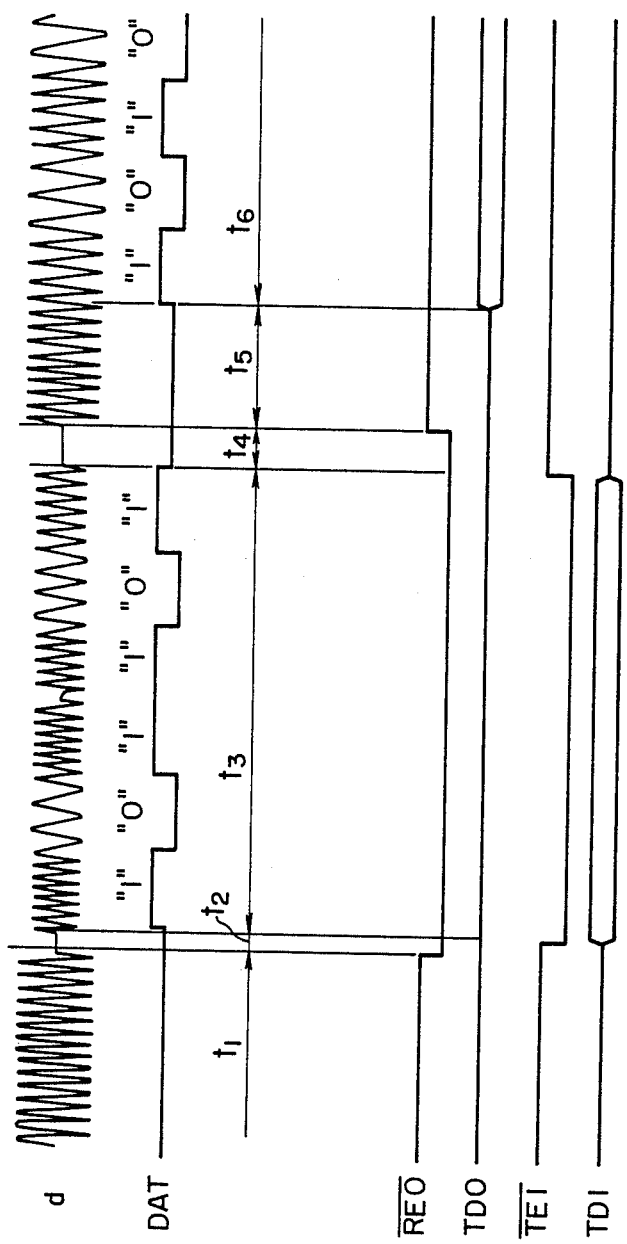
FIG. 4 is a waveform diagram showing various signals in the first embodiment.

FIG. 4 is a waveform diagram showing various signals in the transmission path and is used for a description of the operations of the system. In FIG. 4, reference character d designates a signal waveform at the point d in FIG. 1; DAT, the relationships between the signal waveform and the FM modulation wave data; $\overline{REO}$, the inverse of the signal REO in FIG. 1; and $\overline{TE1}$, the inverse of the signal TE1 in FIG. 1. Further in FIG. 4, TD0 and TD1 designate the data TD0 and TD1 in FIG. 1, respectively. Moreover, $t_1$ designates a period in which the terminal unit 180 is not selected and the oscillator 111 provides the carrier; $t_2$, a response period extending from the time instant the carrier is interrupted until data is transmitted via the modulator 184; $t_3$, a terminal unit data transmission period; $t_4$, a period extending from the time instant the central control device accomplishes a signal receiving operation until it occupies the transmission path to transmit the carrier again; $t_5$, an internal data processing period for the central control device; and $t_6$, a signal transmission period for the central control device.

Figure 3:
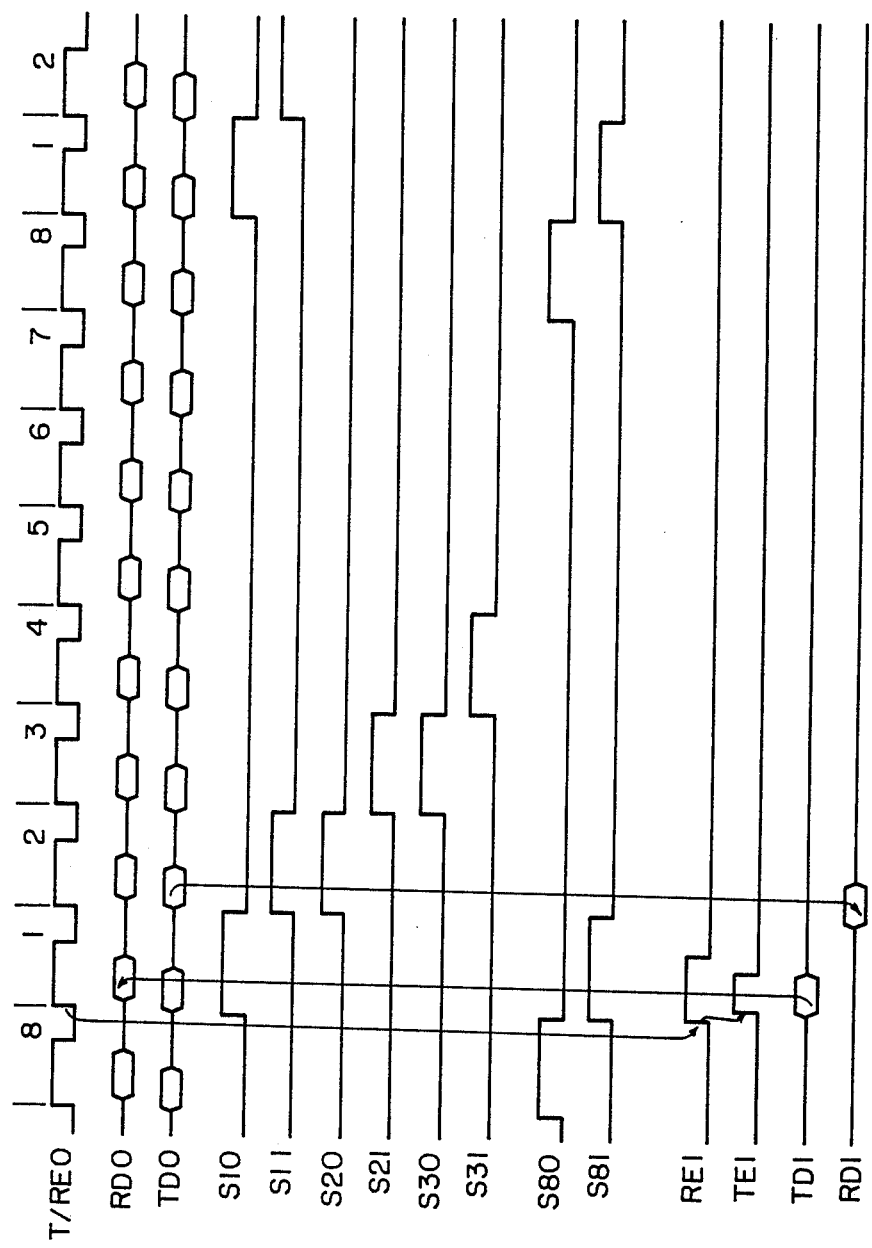
FIG. 3 is a timing chart used for a description of the operation of a second embodiment of the invention.
Figure 5:
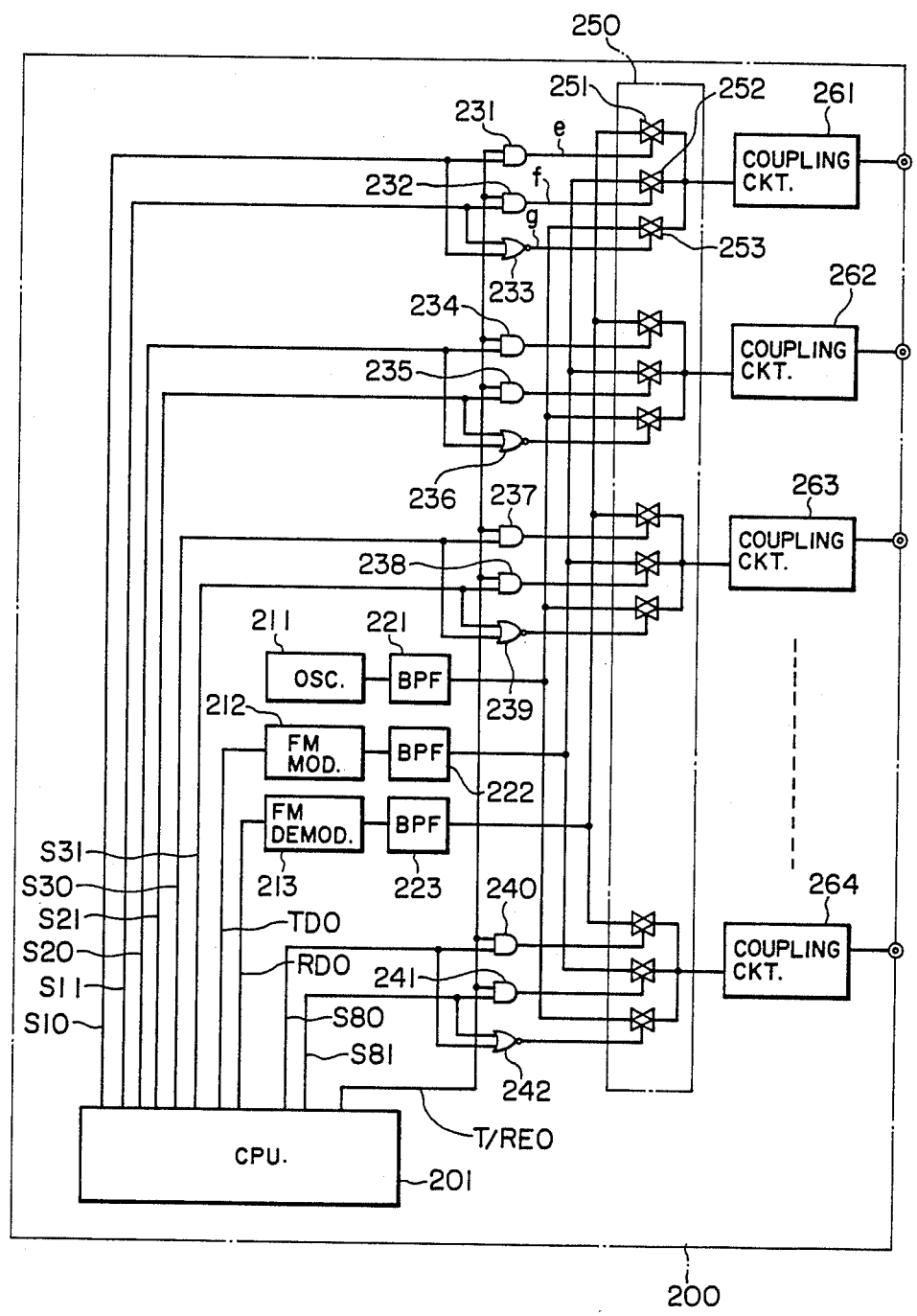
FIG. 5 is a block diagram showing the second embodiment of the invention.

FIGS. 3 and 5 show a second embodiment of the invention in which a central control device operates in the full-duplex mode and the terminal unit operates in the half-duplex mode, similarly to the first embodiment described above. In FIG. 5, reference numeral 200 designates a central control device which includes a central processing unit 201; an analog switch 250 (including switch elements 251, 252, . . . and 253); an oscillator 211; an FM modulator 212; an FM demodulator 213; bandpass filters 221 and 222; and matching coupling circuits 261, 262, . . . and 264. Further in FIG. 5, reference numerals 230, 231, 234, 235, 237, 238, 240 and 241 designate analog-switch-operating AND gates; and 233, 236, 239 and 242, analog-switch-operating NOR gates. The circuit elements perform functions similar to those in the first embodiment of FIG. 1.

The sequence of data communications will be described with reference to the timing chart of FIG. 3. In FIG. 3, the same reference characters as those in FIG. 2 designate the same signals and data. Further in FIG. 3, $S_{10}$ and $S_{11}$ respectively designate a reception selection signal and a transmission selection signal for a terminal #1; $S_{20}$ and $S_{21}$, a reception selection signal and a transmission selection signal for a terminal #2; $S_{30}$ and $S_{31}$, a reception selection signal and a transmission selection signal for a terminal #3; . . . and $S_{80}$ and $S_{81}$, a reception selection signal and a transmission selection signal for a terminal #8. Further in FIG. 3, T/REO designates a transmission-reception shift enabling signal of the central control device 200.

In the system shown in FIG. 5, the central control device 200 performs full-duplex communications to the terminal units, and each terminal unit performs half-duplex communications. That is, as shown in the timing chart of FIG. 3, the central control device 200 performs an operation of receiving signals from the terminal unit #1 and an operation of transmitting signals to the terminal unit #8 simultaneously in the cycle $t_1$, and performs an operation of transmitting signals to the terminal unit #1 and an operation of receiving signals from the terminal unit #2 in the next cycle $t_2$. Thus, the communication efficiency is remarkably improved by the full-duplex mode operations of the central control device.

As is apparent from the above description, the inventive system can be readily so modified that both of central control device and terminal units employ full-duplex communications.

In the above-described embodiments, the transmission system is an FSK (frequency-shift keying) system. However, base-band transmission and PSK (phase-shift keying) can be used as well.

If base-band transmission is employed, for instance, in the embodiment of FIG. 1, the oscillator 111 with which the central control device 100 indicates occupation of the transmission path to the terminal unit should be replaced by a logic circuit or voltage source for producing a logic level "1", the FM modulator 112 should be replaced by a drive circuit which drives the transmission path with a logic level "1" or "0" signal, and the FM demodulator 113 should be replaced by a voltage comparator which subjects the logic level on the transmission path to conversion and waveform shaping.

In the terminal unit also, the FM modulator 184 and the FM demodulator 185 should be replaced by a logic drive circuit and a voltage comparator. In other words, in the above-described FSK transmission system, the carrier is interrupted to allow the terminal unit to detect the occupation of the transmission path; however, in a base-band transmission system, the signal transmission request can be made by changing the logic "1" to the logic "0".

Figure 6:
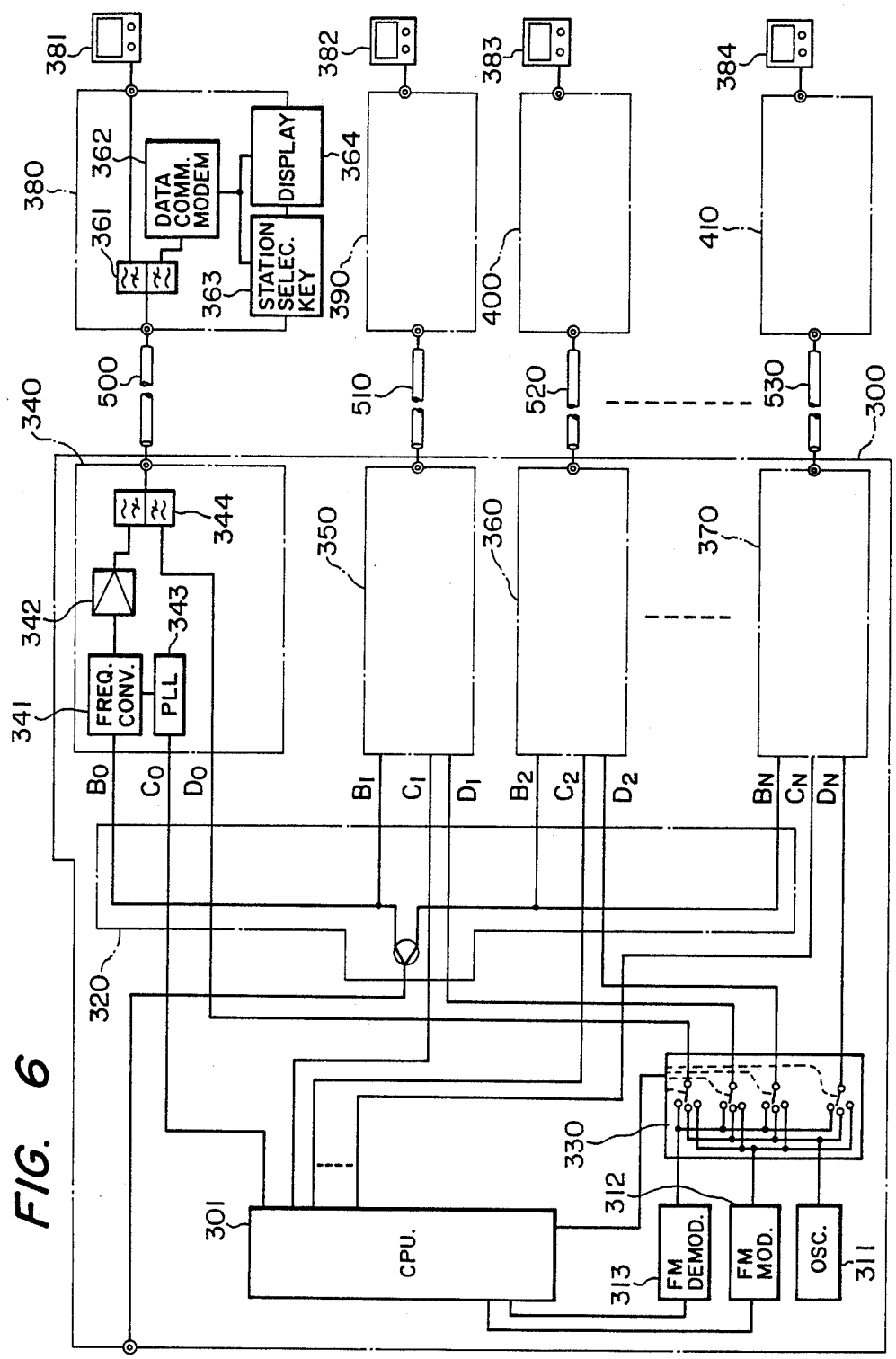
FIG. 6 is a block diagram showing an example of the application of the system of the invention to a CATV system.

The case where the data communication system is installed at a distribution unit at a tap-off position of a main line in a CATV system will be described with reference to FIG. 6. In FIG. 6, reference numeral 300 designates a central control device; 380, 390, 400 and 410, subscribers' terminal units; 381 through 384, TV receivers; and 510, 520, 530 and 540, transmission paths. Reference characters $B_1$ to $B_N$ denote signal input lines and $D_1$ to $D_N$ denote data transmission lines. Reference character A designates an input tereminal receiving a frequency-multiplexed CATV data signal. This signal is applied through a distributor 320 and the signal input lines to converter units 340, 350, 360 and 370. In the respective converter units 340, 350, 360 and 370, a frequency converter 341 for instance, operates to select a selected station signal from the frequency-multiplied CATV data signal according to a tuning frequency signal. The tuning frequency signal is produced by a PLL circuit 343 in response to a station selection signal. The station selection signal which is obtained in accordance with a selected TV channel signal from the respective subscribers' terminal units 380, 390, 400 and 410, is applied through control lines $C_O$ to $C_N$ from the CPU 301. The station signal which is tuned to the selected channel station, is amplified by an RF amplifier 342 for instance, to be applied through a filter 344 and a transmission path 500 to the unit 380.

In the central control device 300, the central processing unit 301 is allowed to carry on data communications with the terminal units and to furnish the station selection data to the PLL circuits in a converter units 340, 350, 360 and 370 according to the channel selection data of the terminal units. Further in FIG. 6, reference numerals 313, 312 and 311 designate an FM modulator and an associated bandpass filter, an FM demodulator and an associated bandpass filter, and an oscillator and an associated bandpass filter, respectively, similarly to the first embodiment shown in FIG. 1. The circuit elements 311, 312 and 313 are connected through an analog switch 330, controlled by the central processing unit 301, and through low-pass filters in the converter units to the transmission paths 500, 510, 520 and 530. Each of the terminal units 380, 390, 400 and 410 includes a high-pass and low-pass filter 361 for separating a station-selected and frequency-converted TV signal and a transmitted frequency-multiplexed data signal from each other; a data communicating modem 362, a station selecting key 363; and a display unit 364 for displaying a selected station.

In the terminal unit, a key or the like is operated to input a selected TV channel. Upon reception of a periodic transmission request signal from the central control device 300, the terminal unit supplies the channel data to the central control device 300. As a result, in the central control device 300, a signal receiving operation is carried out in the manner described with reference to FIG. 1, the station selection data (or the inhibition data if utilization of the channel is not permitted) is applied to the PLL circuit in the converter unit, and the display data is reported back to the terminal unit. The terminal units are sequentially called by polling. For instance, when utilization of the channel is not permitted, an interfering signal is superposed on the picture signal from the center.

The invention has the following effects:

(a) At the start of communications, no special protocol for signal transmission and reception is required. Therefore, communications can be achieved at a high speed and with a high efficiency. The arrangement of the data communications system of the invention is most suitable in a small scale data communication network because, not only in the central control device but also in the terminal units, the hardware and software for communications are less complex, and hence the data communications system of the invention can be realized at low cost.

(b) The central control device can start data communications at a desired time instant, and can support a plurality of terminal units without special hardware and software.

(c) As is apparent from the above description, application of the data communications system of the invention to the distribution system unit of a CATV system provides a more effective and advantageous scrambling system.

I claim:

1. A data communications system for performing data communications between a central control device and a plurality of terminal units, comprising:

a plurality of transmission paths coupling said central control device to a like numbered plurality of said terminal units;

means for applying a transmission carrier to ones of said transmission paths when said central control device neither transmits information to nor receives information from terminal units associated with said ones of said transmission paths;

means for suspending application of said carrier to a selected transmission path when communications are to be initiated between said central control device and the terminal unit associated with said selected path; and at each terminal unit, means for detecting the suspension of reception of said carrier, said suspension constituting a transmission request directed to said terminal unit, and means for performing an up-data transmission to said central control device in response to a detected transmission request.

2. The data communications system of claim 1, wherein said means for applying a transmission carrier comprises an oscillator, a bandpass filter for limiting a bandwidth of an output of said oscillator, and analog switch means for coupling an output of said bandpass filter to ones of said transmission paths.

3. The data communication system of claim 2, wherein said means for suspending application of said carrier comprises gating means for operating said analog switch means.

* * * * *